United States Patent
Alperin et al.

(10) Patent No.: US 8,078,476 B2
(45) Date of Patent: Dec. 13, 2011

(54) CROSS-PLATFORM CALENDAR NOTIFICATIONS

(75) Inventors: Jordan Alperin, Denver, CO (US); Rich Cerami, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 1143 days.

(21) Appl. No.: 11/399,097

(22) Filed: Apr. 5, 2006

(65) Prior Publication Data
US 2007/0239559 A1 Oct. 11, 2007

(51) Int. Cl.
G06Q 99/00 (2006.01)
G06F 15/16 (2006.01)

(52) U.S. Cl. .......................................... 705/1.1; 709/219

(58) Field of Classification Search ................ 705/1, 26, 705/27, 1.1, 26.1; 709/219
See application file for complete search history.

(56) References Cited

U.S. PATENT DOCUMENTS

| | | |
|---|---|---|
| 4,837,798 A | 6/1989 | Cohen et al. |
| 5,410,691 A | 4/1995 | Taylor |
| 5,479,411 A | 12/1995 | Klein |
| 5,524,137 A | 6/1996 | Rhee |
| 5,633,484 A | 5/1997 | Zancho et al. |
| 5,689,550 A | 11/1997 | Garson et al. |
| 5,724,410 A | 3/1998 | Parvulescu et al. |
| 5,742,905 A | 4/1998 | Pepe et al. |
| 5,920,835 A | 7/1999 | Huzenlaub et al. |
| 5,974,449 A | 10/1999 | Chang et al. |
| 6,014,429 A | 1/2000 | LaPorta et al. |
| 6,081,830 A | 6/2000 | Schindler |
| 6,094,681 A * | 7/2000 | Shaffer et al. ................ 709/224 |
| 6,154,772 A | 11/2000 | Dunn et al. |
| 6,173,259 B1 | 1/2001 | Bijl et al. |
| 6,366,651 B1 | 4/2002 | Griffith et al. |
| 6,421,733 B1 | 7/2002 | Tso et al. |
| 6,438,221 B1 | 8/2002 | Lee et al. |
| 6,442,606 B1 | 8/2002 | Subbaroyan et al. |
| 6,459,776 B1 | 10/2002 | Aktas et al. |
| 6,463,463 B1 * | 10/2002 | Godfrey et al. ................ 709/206 |
| 6,483,899 B2 | 11/2002 | Agraharam et al. |
| 6,556,217 B1 | 4/2003 | Makipaa et al. |
| 6,564,264 B1 | 5/2003 | Creswell |
| 6,675,261 B2 | 1/2004 | Shandony |
| 6,694,004 B1 | 2/2004 | Knoerle |

(Continued)

FOREIGN PATENT DOCUMENTS
WO WO 97/23082 6/1997

OTHER PUBLICATIONS

Jordan Alperin, "Communications Presentation in a Calendar Perspective", U.S. Appl. No. 11/399,096, filed Apr. 5, 2006, Office action Jan. 22, 2009 and response Apr. 14, 2009.

(Continued)

Primary Examiner — Amee A Shah (57) ABSTRACT

Systems, methods, and machine-readable media to provide notification of calendar events across multiple platforms of potentially diverse types. In one embodiment, a method of cross-platform calendar notification can comprise detecting an occurrence of a previously set calendar event. Profile information for a user associated with the calendar event can be read and one or more end devices to which to provide notification of the occurrence of the calendar event can be determined based on the profile information. A notification message can be generated indicating occurrence of the calendar event. The notification message can be sent to each of the one or more end devices.

23 Claims, 5 Drawing Sheets

U.S. PATENT DOCUMENTS

| | | |
|---|---|---|
| 6,754,904 B1 | 6/2004 | Cooper et al. |
| 6,768,789 B1 | 7/2004 | Wilk |
| 6,775,658 B1 | 8/2004 | Zothner |
| 6,782,253 B1 | 8/2004 | Shleyn et al. |
| 6,799,174 B2 | 9/2004 | Chipman et al. |
| 6,801,793 B1 | 10/2004 | Aarnio et al. |
| 6,816,582 B2 | 11/2004 | Levine |
| 6,826,173 B1 | 11/2004 | Kung et al. |
| 6,826,407 B1 | 11/2004 | Helferich |
| 6,832,259 B2 | 12/2004 | Hymel et al. |
| 6,832,377 B1 | 12/2004 | Havemose |
| 6,879,838 B2 | 4/2005 | Rankin et al. |
| 6,882,709 B1 | 4/2005 | Sherlock |
| 6,938,087 B1 | 8/2005 | Abu-Samaha |
| 6,964,014 B1 | 11/2005 | Parish |
| 6,977,993 B2 | 12/2005 | Starbuck et al. |
| 6,988,128 B1 * | 1/2006 | Alexander et al. ............ 709/206 |
| 7,013,331 B2 | 3/2006 | Das |
| 7,069,301 B2 | 6/2006 | Jerbi et al. |
| 7,069,309 B1 * | 6/2006 | Dodrill et al. ................. 709/219 |
| 7,072,056 B1 | 7/2006 | Greaves et al. |
| 7,076,734 B2 | 7/2006 | Wolff et al. |
| 7,106,473 B2 | 9/2006 | Sekiguchi |
| 7,120,870 B1 | 10/2006 | Nakamura |
| 7,188,073 B1 | 3/2007 | Tam |
| 7,212,543 B1 | 5/2007 | Arwald et al. |
| 7,212,614 B1 | 5/2007 | Burg et al |
| 7,219,163 B2 | 5/2007 | Robinson et al. |
| 7,224,774 B1 | 5/2007 | Brown et al. |
| 7,272,662 B2 | 9/2007 | Chesnais et al. |
| 7,295,752 B1 | 11/2007 | Jain et al. |
| 7,310,329 B2 | 12/2007 | Vieri et al. |
| 7,385,875 B2 | 6/2008 | May |
| 7,526,572 B2 | 4/2009 | Omar et al. |
| 7,551,727 B2 | 6/2009 | Howell et al. |
| 7,587,033 B2 | 9/2009 | Crago et al. |
| 7,596,369 B2 | 9/2009 | Alperin et al. |
| 7,688,962 B1 | 3/2010 | Knoerie et al. |
| 2002/0026457 A1 | 2/2002 | Jensen |
| 2002/0032589 A1 | 3/2002 | Shah |
| 2002/0075519 A1 | 6/2002 | Konsella et al. |
| 2002/0076027 A1 | 6/2002 | Bernnan et al. |
| 2002/0082030 A1 | 6/2002 | Berndt et al. |
| 2002/0087704 A1 | 7/2002 | Chesnais et al. |
| 2002/0098831 A1 | 7/2002 | Castell |
| 2002/0102965 A1 | 8/2002 | Mandahl et al. |
| 2002/0128036 A1 | 9/2002 | Yach |
| 2002/0144273 A1 | 10/2002 | Reto |
| 2002/0156871 A1 | 10/2002 | Munarriz et al. |
| 2002/0170067 A1 | 11/2002 | Norstrom et al. |
| 2002/0174194 A1 | 11/2002 | Mooney et al. |
| 2002/0194150 A1 | 12/2002 | Bates et al. |
| 2003/0088633 A1 | 5/2003 | Chiu et al. |
| 2003/0097262 A1 | 5/2003 | Nelson |
| 2003/0120717 A1 | 6/2003 | Callaway et al. |
| 2003/0147369 A1 | 8/2003 | Singh et al. |
| 2003/0149646 A1 | 8/2003 | Chen et al. |
| 2003/0172139 A1 | 9/2003 | Srinivasan et al. |
| 2003/0172175 A1 | 9/2003 | McCormack et al. |
| 2004/0044663 A1 | 3/2004 | Horompoly |
| 2004/0054719 A1 | 3/2004 | Daigle |
| 2004/0058673 A1 | 3/2004 | Irlam et al. |
| 2004/0075698 A1 | 4/2004 | Gao et al. |
| 2004/0091089 A1 | 5/2004 | Wyn |
| 2004/0199665 A1 | 10/2004 | Omar et al. |
| 2004/0268265 A1 | 12/2004 | Berger |
| 2005/0015311 A1 | 1/2005 | Frantz et al. |
| 2005/0015443 A1 | 1/2005 | Levine et al. |
| 2005/0018653 A1 | 1/2005 | Phillips et al. |
| 2005/0033806 A1 | 2/2005 | Harvey et al. |
| 2005/0037762 A1 | 2/2005 | Gurbani et al. |
| 2005/0053206 A1 | 3/2005 | Chingon et al. |
| 2005/0075097 A1 | 4/2005 | Lehikoinen |
| 2005/0086282 A1 | 4/2005 | Anderson et al. |
| 2005/0089149 A1 | 4/2005 | Elias |
| 2005/0091327 A1 | 4/2005 | Koch |
| 2005/0101343 A1 | 5/2005 | Hsiao |
| 2005/0201533 A1 | 9/2005 | Emam et al. |
| 2005/0235307 A1 | 10/2005 | Relan et al. |
| 2005/0246666 A1 | 11/2005 | Kalinoski |
| 2005/0262542 A1 | 11/2005 | DeWeese et al. |
| 2006/0017983 A1 | 1/2006 | Syri et al. |
| 2006/0026302 A1 | 2/2006 | Bennett et al. |
| 2006/0095868 A1 | 5/2006 | Sawada |
| 2006/0104293 A1 | 5/2006 | Kopp et al. |
| 2006/0104430 A1 | 5/2006 | Kirkland et al. |
| 2006/0104431 A1 | 5/2006 | Emery et al. |
| 2006/0123082 A1 | 6/2006 | Digate et al. |
| 2006/0156251 A1 | 7/2006 | Suhail |
| 2006/0168065 A1 | 7/2006 | Martin |
| 2006/0250991 A1 | 11/2006 | Jabri et al. |
| 2006/0265397 A1 | 11/2006 | Bryan et al. |
| 2006/0265427 A1 | 11/2006 | Cohen et al. |
| 2007/0016643 A1 | 1/2007 | Boss et al. |
| 2007/0079010 A1 | 4/2007 | Heredia et al. |
| 2007/0097394 A1 | 5/2007 | Zaima et al. |
| 2007/0174448 A1 | 7/2007 | Ahuja et al. |
| 2007/0198648 A1 | 8/2007 | Allen et al. |
| 2007/0239833 A1 | 10/2007 | Alperin et al. |
| 2007/0239880 A1 | 10/2007 | Alperin et al. |
| 2007/0239895 A1 | 10/2007 | Alperin et al. |
| 2008/0177616 A1 | 7/2008 | Nemirofsky et al. |
| 2011/0167122 A1 | 7/2011 | Groves et al. |

OTHER PUBLICATIONS

U.S. Appl. No. 11/228,446, filed Sep. 15, 2005, Jordan Alperin.
U.S. Appl. No. 11/255,089, filed Oct. 19, 2005, Jordan Alperin et al.
U.S. Appl. No. 11/266,011, filed Nov. 2, 2005, Jordan Alperin et al.
U.S. Appl. No. 11/293,028, filed Dec. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.
U.S. Appl. No. 11/399,585, filed Apr. 5, 2006, Jordan Alperin et al.
U.S. Appl. No. 11/399,098, filed Apr. 5, 2006, Jordan Alperin et al.
U.S. Appl. No. 11/399,584, filed Apr. 5, 2006, Jordan Alperin.
U.S. Appl. No. 11/400,643, filed Apr. 6, 2006, Jordan Alperin et al.
U.S. Appl. No. 11/400,616, filed Apr. 6, 2006, Jordan Alperin et al.
U.S. Appl. No. 11/400,644, filed Apr. 6, 2006, Jordan Alperin et al.
U.S. Appl. No. 11/383,620, filed May 16, 2006, Jordan Alperin.
Good Technology, Inc., "Goodlink Enterprise Edition 4.5", Published in: US, Product Brochure, 4 pages.
Koontz, Alan "Find in Page Script", Oct. 13, 1969, Dynamic Drive, "http:/www.dynamicdrive.com/dynamicindex11/findpage.htm", 2 pages.
The Web Design Resource, "Manipulating Font Size and Color", Jun. 27, 1998, The Web Design Resource, 2 pages.
U.S. Appl. No. 11/228,446, Advisory Action dated Jan. 8, 2009, 3 pages.
U.S. Appl. No. 11/228,446, Advisory Action dated Oct. 1, 2009, 3 pages.
U.S. Appl. No. 11/228,446, Final Office Action dated May 18, 2010, 15 pages.
U.S. Appl. No. 11/228,446, Final Office Action dated Jul. 24, 2009, 11 pages.
U.S. Appl. No. 11/228,446, Final Office Action dated Oct. 24, 2008, 6 pages.
U.S. Appl. No. 11/228,446, Office Action dated Jan. 4, 2010, 17 pages.
U.S. Appl. No. 11/228,446, Office Action dated Jun. 3, 2008, 13 pages.
U.S. Appl. No. 11/228,446, Office Action dated Mar. 3, 2009, 12 pages.
U.S. Appl. No. 11/255,089, Final Office Action dated Sep. 24, 2009.
U.S. Appl. No. 11/255,089, Appeal Brief dated Apr. 26, 2010, 17 pages.
U.S. Appl. No. 11/255,089, Advisory Action dated Dec. 15, 2009, 3 pages.
U.S. Appl. No. 11/255,089, Office Action dated Mar. 10, 2009, 17 pages.
U.S. Appl. No. 11/255,089, Office Action dated Oct. 8, 2008, 18 pages.
U.S. Appl. No. 11/266,011, Office Action dated Dec. 22, 2008, 12 pages.

U.S. Appl. No. 11/266,011, Office Action dated Aug. 19, 2010, 19 pages.
U.S. Appl. No. 11/266,011, Advisory Action dated Apr. 23, 2010, 2 pages.
U.S. Appl. No. 11/266,011, Office Action dated Jun. 10, 2009, 12 pages.
U.S. Appl. No. 11/266,011, Final Office Action dated Jan. 28, 2010, 11 pages.
U.S. Appl. No. 11/292,801, Office Action dated Mar. 3, 2009, 9 pages.
U.S. Appl. No. 11/293,028, Advisory Action dated Jul. 6, 2009, 19 pages.
U.S. Appl. No. 11/293,028, Advisory Action dated May 23, 2008, 3 pages.
U.S. Appl. No. 11/293,028, Final Office Action dated Apr. 15, 2009, 12 pages.
U.S. Appl. No. 11/293,028, Final Office Action dated Mar. 17, 2008, 11 pages.
U.S. Appl. No. 11/293,028, Office Action dated Aug. 13, 2008, 9 pages.
U.S. Appl. No. 11/293,028, Office Action dated Nov. 14, 2007, 11 pages.
U.S. Appl. No. 11/293,028, Notice of Allowance dated Oct. 30, 2009, 16 pages.
U.S. Appl. No. 11/399,096, Final Office Action dated Jun. 17, 2009, 11 pages.
U.S. Appl. No. 11/399,096, Office Action dated Dec. 7, 2009, 10 pages.
U.S. Appl. No. 11/399,096, Office Action dated Jan. 22, 2009, 14 pages.
U.S. Appl. No. 11/399,096, Final Office Action dated May 24, 2010, 12 pages.
U.S. Appl. No. 11/399,098, Notice of Allowance dated Jun. 2, 2009, 6 pages.
U.S. Appl. No. 11/399,098, Office Action dated Aug. 25, 2008, 13 pages.
U.S. Appl. No. 11/399,098, Terminal Disclaimer dated Nov. 25, 2008, 1 page.
U.S. Appl. No. 11/399,098, Requirement for Election/Restriction dated Feb. 25, 2009, 6 pages.
U.S. Appl. No. 11/399,098, Response to Requirement for Election/Restriction dated Mar. 11, 2009, 10 pages.
U.S. Appl. No. 11/399,585, Office Action dated Mar. 24, 2009, 16 pages.
U.S. Appl. No. 11/399,585, Advisory Action dated Jan. 25, 2010, 3 pages.
U.S. Appl. No. 11/399,585, Final Office Action dated Nov. 4, 2009, 10 pages.
U.S. Appl. No. 11/399,585, Non-Final Office Action dated Sep. 21, 2010, 15 pages.
U.S. Appl. No. 11/400,643, Final Office Action dated Jul. 27, 2009, 18 pages.
U.S. Appl. No. 11/400,643, Office Action dated Jan. 9, 2009, 17 pages.
U.S. Appl. No. 11/400,643, Advisory Action dated Jan. 19, 2009, 3 pages.
U.S. Appl. No. 11/400,644, Office Action dated Jan. 21, 2009, 16 pages.
WWW.COMCAST.NET/STORAGE, "Comcast On Line Storage", 2005, Published in: US, Internet Website, 1 page.
WWW.IBACKUP.COM, "Flexible Storage Solutions For The Internet Age", Nov. 2005, Published in: US, Internet Website, 1 page.
WWW.MYDOCSONLINE, "File and Data Storage", Nov. 2005, Published in: US, Internet Website, 2 pages.
WWW.STREAMLOAD.COM, "Strearnload—Freedom for Your Digital Lifestyle", Nov. 2005, Published in: US, Internet Website, 1 page.
WWW.XDRIVE.COM, "Secure On Line Storage", Nov. 2005, Published in : US, Internet Website, 2 pages.
U.S. Appl. No. 11/400,616, Final Office Action dated Feb. 1, 2010, 16 pages.
U.S. Appl. No. 11/400,616, Office Action dated Jul. 13, 2009, 21 pages.
U.S. Appl. No. 11/399,584, Examiner's Answer to Appeal Brief dated Jun. 22, 2009, 16 pages.
U.S. Appl. No. 11/399,584, Appeal Brief dated Mar. 12, 2009, 24 pages.
U.S. Appl. No. 11/399,584, Advisory Action dated Dec. 18, 2008, 3 pages.
U.S. Appl. No. 11/399,584, Final Office Action dated Sep. 12, 2008, 12 pages.
U.S. Appl. No. 11/399,584, Office Action dated Mar. 6, 2008, 10 pages.
U.S. Appl. No. 11/399,096, Office Action dated Oct. 27, 2010, 11 pages.
U.S. Appl. No. 11/383,620, Office Action dated Nov. 9, 2010, 17 pages.
U.S. Appl. No. 11/383,620, Final Office Action dated May 14, 2010, 20 pages.
U.S. Appl. No. 11/383,620, Office Action dated Nov. 10, 2009, 15 pages.
U.S. Appl. No. 11/383,620, Office Action dated Apr. 2, 2009, 14 pages.
U.S. Appl. No. 11/400,643, Office Action dated Mar. 7, 2011, 21 pages.
U.S. Appl. No. 11/399,585, Final Office Action dated Feb. 8, 2011, 23 pages.
U.S. Appl. No. 11/266,011, Final Office Action dated Feb. 4, 2011, 25 pgs.
U.S. Appl. No. 11/399,096, Final Office Action dated Feb. 11, 2011, 15 pages.
U.S. Appl. No. 11/228,446, Office Action dated Feb. 22, 2011, 20 pages.
Alan Koontz, "Find in Page Script", Jun. 2003, Dynamic-Drive, http://www.dynamicdrive.com/dynamicindex11/findpage.htm, 7 pages.
Brian Suda et al., "Enhance Usability by Highlighting Search Terms," A List Apart, http://www.alistapart.com/articles/searchhighlight, 4 pages.
Chris McC, "Determining if span/div is visible or not," Jun. 2004, JavaScript and AJAX Forum, http://www.webmasterworld.com/forum91/1935.htm, 4 pages.
Vic Phillips, web site "http://homepgae.ntlworld.com/vwphillips/SearchForText.htm" titled "JavaScript Code for Search for Text", Jan. 15, 2005, 5 pages.
Ashok Hariharan, "DHTML Text Marker—An Experiment," Jul. 2002, evolt.org, http://evolt.org/node/29028, 8 pages.
U.S. Appl. No. 11/400,643, Office Action dated Oct. 14, 2010, 19 pages.
U.S. Appl. No. 11/400,643, Office Action dated Mar. 7, 2011, 21 pages.
U.S. Appl. No. 11/400,616, Office Action dated Mar. 16, 2011, 16 pages.
U.S. Appl. No. 11/399,096, Notice of Panel Decision from Pre-Appeal Brief Review dated May 20, 2011, 2 pages.
U.S. Appl. No. 11/399,096, Office Action dated Jul. 12, 2011, 14 pages.
U.S. Appl. No. 11/399,585; Office Action dated Jul. 18, 2011, 20 pages.
U.S. Appl. No. 11/400,643; Notice of Panel Decision dated Jul. 11, 2011; 2 pages.
U.S. Appl. No.11/400,643 Non Final Office Action dated Jul. 28, 2011; 20 pages.
U.S. Appl. No. 11/400,616; Non Final Office Action dated Aug. 18, 2011; 35 pages.
U.S. Appl. No. 11/266,011; Notice of Allowance dated Oct. 7, 2011; 18 pages.

* cited by examiner

CROSS-PLATFORM CALENDAR NOTIFICATIONS

CROSS REFERENCE TO RELATED APPLICATIONS

This application is related to co-pending U.S. patent application Ser. No. 11/255,089 entitled "Cross-Platform Support for a Variety of Media Types" filed Oct. 19, 2005, and U.S. patent application Ser. No. 11/399,096 entitled "Communication Presentation in a Calendar Perspective" filed contemporaneously herewith, both of which are herein incorporated by reference in its entirety.

BACKGROUND OF THE INVENTION

Embodiments of the present invention relate generally to communications networks and more particularly to supporting calendar event notifications across various platforms or devices.

Today it is very common, and probably the norm, for an individual to have and regularly use a number of communications devices of different types that communicate via a variety of different media. For example, an individual may, on a daily basis, use a number of different telephones such as a work line a home line, one or more cell phones, etc. Additionally, this same individual may have and use a number of other communications devices and/or media such as one or more email accounts, one or more instant message accounts, etc. that are accessible through any of a number of different devices such as personal computers various portable devices, and/or other network attached devices that communicate via the Internet or other network.

Some or even all of these devices may provide calendars with an ability to set calendar events. Furthermore, each device can provide a notification to the user when one of these calendar events has occurred. For example, a user may place in his calendar on his Personal Digital Assistant (PDA), cell phone, or other device a event indicating a meeting or appointment at a specified time and date. Furthermore, a notification can be given at or before this time to remind the user of the meeting or appointment. However, if the user is not in possession of that particular device, e.g., he left his cell phone at home, when the notification occurs, the notification will go unnoticed and the user may forget or miss the appointment.

Furthermore, managing these calendar events, especially between multiple devices, can be burdensome. While some systems provide for forwarding calendar event notifications to other devices, these systems are extremely limited in the types of devices that may be used. For example, such notifications are limited to cell phone with particular capabilities. Therefore, these systems are not easily extensible and cannot operate with other types of device. Currently, there is no way for a user of multiple end devices of different types to share or set calendar events that can be presented to all or some subset of all of these devices regardless of the type of end device. Hence, there is a need for methods and systems that allow for cross-platform calendar notification.

BRIEF SUMMARY OF THE INVENTION

Systems, methods, and machine-readable media are disclosed to provide notification of calendar events across multiple platforms of potentially diverse types. In one embodiment, a method of cross-platform calendar notification can comprise detecting an occurrence of a previously set calendar event. Profile information for a user associated with the calendar event can be read and one or more end devices to which to provide notification of the occurrence of the calendar event can be determined based on the profile information. A notification message can be generated indicating occurrence of the calendar event. The notification message can be sent to each of the one or more end devices.

According to one embodiment, the method can further comprise determining from the profile information whether calendar notifications are enabled. This determination can be made prior to determining one or more end devices to which to provide notification of the calendar event. In such a case determining one or more end devices to which to provide notification of the calendar event can be performed in response to determining calendar notifications are enabled.

According to another embodiment, prior to detecting the occurrence of the calendar event a request to set the calendar event can be received. The request can include event definition information. The event definition information can comprise, for example, an indication of the user associated with the calendar event, an indication of the one or more end devices to which to provide notification of the calendar event, an indication of an event type, an indication of the event, etc. The event definition information can be read from the request to set the calendar event and at least some of the event definition information can be stored in the profile information for the user associated with the calendar event. One or more calendar events can then be set based at least in part on the event definition information.

According to yet another embodiment, a system for providing cross-platform calendar notifications can comprise a communications bus and a user profile database communicatively coupled with the communications bus and adapted to maintain profile information for a plurality of users. The system can also include a plurality of end devices of different types. Each end device can be communicatively coupled with the communications bus and can be adapted to send and receive common language messages via the communications bus, to translate common language messages received from the communications bus to a format specific to the end device based on the type, and to store user profile information in the user profile database. A manager can be communicatively coupled with the communications bus and adapted to detect an occurrence of a previously set calendar event, read profile information for a user associated with the calendar event from the user profile database, determine based on the profile information for the user associated with the calendar event one or more recipient end devices from the plurality of end devices, generate a common language message comprising a notification message indicating occurrence of the calendar event, and send the notification message to each of the one or more recipient end devices.

In some cases, the manager can be further adapted to determine from the profile information for the user associated with the calendar event whether calendar notifications are enabled prior to determining one or more recipient end devices. In such a case, determining one or more recipient end devices, generating a common language message comprising a notification message indicating occurrence of the calendar event, and sending the notification message to each of the one or more recipient end devices can be performed in response to determining calendar notifications are enabled.

According to another embodiment, the manager can be further adapted to, prior to detecting the occurrence of the calendar event, receive a common language message from one of the plurality of end devices. The common language message can comprise a request to set the calendar event and include event definition information. The event definition information can comprise, for example, an indication of the user associated with the calendar event, an indication of the one or more end devices to which to provide notification of the calendar event, an indication of an event type, an indication of the event, etc. The manager can be adapted to read the event definition information from the request to set the calendar event, store at least some of the event definition information in the profile information for the user associated with the calendar event, and set one or more calendar events based at least in part on the event definition information.

According to still another embodiment, a machine-readable medium can have stored thereon a series of instruction which, when executed by a processor, cause the processor to perform cross-platform calendar notifications by detecting an occurrence of a previously set calendar event, reading profile information for a user associated with the calendar event, and determining based on the profile information one or more end devices to which to provide notification of occurrence of the calendar event.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for providing notification of calendar events across multiple platforms of potentially diverse types. As will be described in detail below, setting of a calendar event can begin when a request to set the calendar event is received from an end device such as a user's cell phone, Personal Computer (PC), Personal Digital Assistant (PDA), or other device. The request can include event definition information. The event definition information can comprise, for example, an indication of the user associated with the calendar event, an indication of the one or more end devices to which to provide notification of the calendar event, an indication of an event type, an indication of the event, etc. The event definition information can be read from the request to set the calendar event and at least some of the event definition information can be stored in profile information for the user associated with the calendar event. One or more calendar events can then be set based at least in part on the event definition information.

Then, at a specified time or upon the occurrence of some other event, the occurrence of the previously set calendar event can be detected. Profile information for the user associated with the calendar event can be read and one or more end devices to which to provide notification of the occurrence of the calendar event can be determined based on the profile information. A notification message can be generated indicating occurrence of the calendar event. The notification message can be sent to each of the one or more end devices. Therefore, a calendar event set via one device can be detected and a notice can be provided to other devices indicated by the profile information for the user associated with or identified by that event. Furthermore, as will be discussed in detail below, these notifications can be provided to multiple devices regardless of the types of devices.

Figure 1:
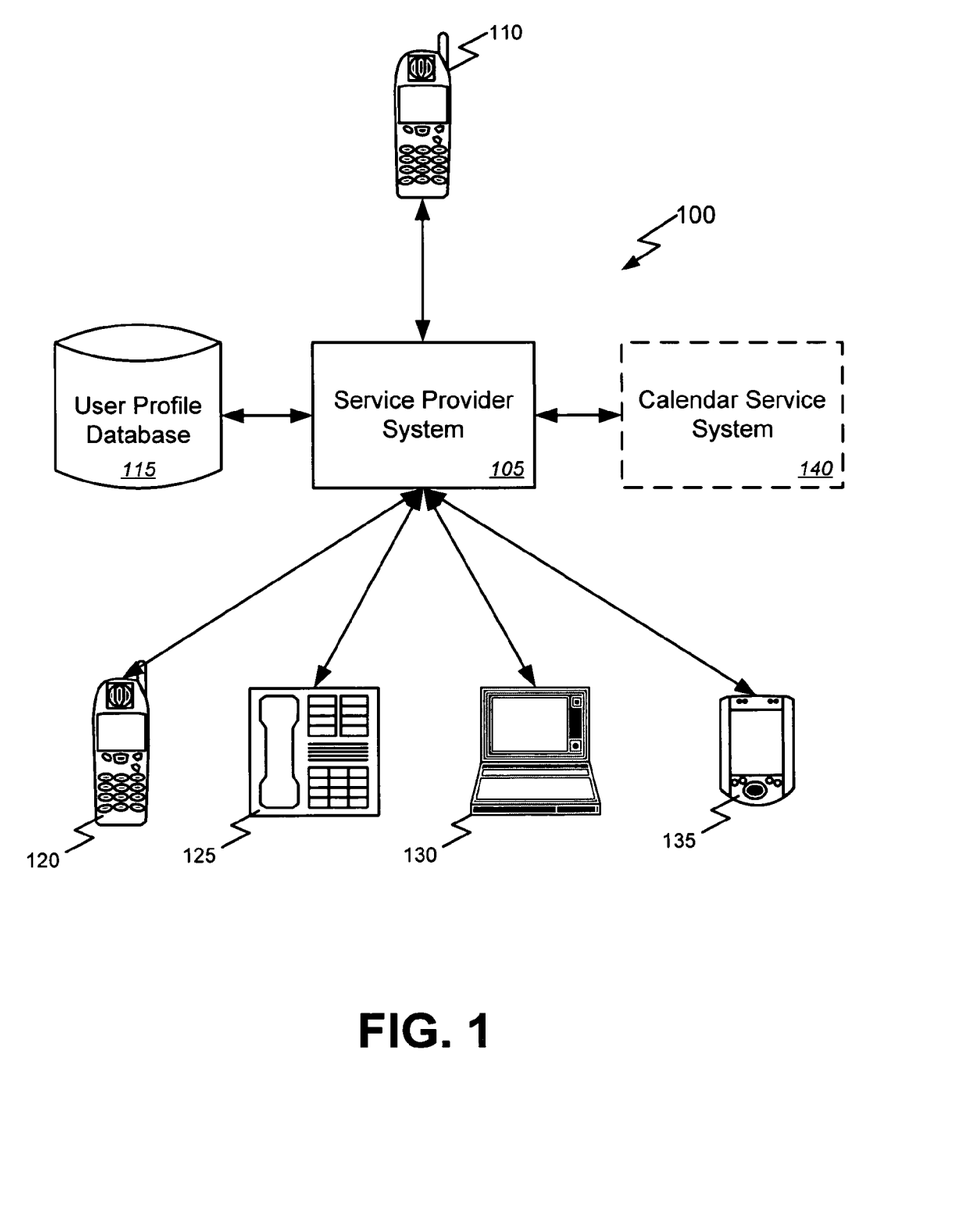
FIG. 1 is a block diagram illustrating, at a high-level, functional components of an architecture for providing cross-platform calendar notification according to one embodiment of the present invention.

FIG. 1 is a block diagram illustrating, at a high-level, functional components of an architecture for providing cross-platform calendar notification according to one embodiment of the present invention. In this example, the system 100 includes an initiating device 110 communicatively coupled with a service provider system 105. The service provider system 105 is communicatively coupled with a user profile database 115 and a plurality of recipient devices 120-135. Generally speaking, the initiating device 110 can initiate a communication such as a telephone call to one of the recipient devices 120-135 through the service provider system 105. Furthermore, as will be discussed in detail below, the initiating end device 110 can request to set a calendar event.

Initiating device 110 can be any of a number of possible communication devices. While illustrated here as resembling a cell phone, initiating device can also be a land line telephone, a Personal Digital Assistant (PDA), any of a variety of wireless devices, a personal computer, etc. Regardless of the exact type of device, initiating device 110 can be communicatively coupled with service provider system 105 via typical communication media such as a cellular network, a land line telephone, a Local Area Network (LAN), Wide Area Network (WAN), the Internet, or other type of network. Through this communication media, initiating device 110 can send and receive communications to and from the service provider system 105.

Service provider system 105 can be one or more systems adapted to provide communications services of one or more types to the initiating device 110. For example, service provider system 105 can be a system providing cellular telephone services, land line telephone services, Internet services, etc. Service provider system 105 can be adapted to send and receive communications of an appropriate type to and from initiating device 110.

User profile database 115 can be communicatively coupled with service provider system 105 via a Local Area Network (LAN), Wide Area Network (WAN), the Internet, or other type of network or other communications media. While user profile database 115 is shown in this example as being separate from the service provider system 105, the user profile database may be internal or external to the service provider system 105 or may be part of and/or maintained by another system and may be either local to or remote from the service provider system 105. Regardless of the exact configuration, user profile database 115 maintains a set of user profile data or preferences for one or more users of the service provider system 105 such as a user of initiating device 110 and/or users of recipient devices 120-135. For example, the user profile database 115 may include information relating to call features such as call forwarding or other information relating to other types of communications such as email delivery options.

The system 100 can also optionally include calendar service system 140. If used, calendar service system can set and/or track calendar events for the various devices or users. That is, when a request to set a calendar event is received from the initiating device 110, the calendar service system can set a timer or other event based on the information from the request. Alternatively, if the calendar service system 140 is not used, the service provider system 105 can be used to set and/or track calendar events for the various deices or users.

As will be seen, user profile database 115 can also store information related to calendar notification features. More specifically, user profile database 115 can include a list of phone numbers, device addresses, or other identifying information for one or more recipient devices that a user of an initiating device may wish to notify on the occurrence of a calendar event. In other words, the user profile database 115 can include an identifier, such as a phone number, email address, Internet Protocol (IP) address, instant message address, physical address, MAC address, etc for each of one or more possible recipient devices. When the service provider system 105 or calendar service system 140 detects the occurrence of a calendar event, the service provider system 105 can look up devices to be informed of the occurrence and generate a message, communication, notification, etc. appropriate to each of those devices to inform the recipient of the calendar event. In this way, the identified devices can "ring" or otherwise inform the user of the calendar event.

Recipient devices 120-135 can be any of a number of possible communication devices. For example, recipient devices can be cell phones, land line telephones, Personal Digital Assistants (PDAs), any of a variety of wireless devices, Personal Computers (PCs), etc. Regardless of the exact types of devices, recipient devices 120-135 can be communicatively coupled with service provider system 105 via typical communication media such as a cellular network, a land line telephone, a Local Area Network (LAN), Wide Area Network (WAN), the Internet, and/or other types of networks. Through this communication media recipient devices 120-135 can send and receive communications to and from the service provider system 105.

Importantly, while referred to herein as a recipient device or an initiating device for the sake of explanation, any device coupled with the service provider system 105 can potentially, at various times, act as either an initiating device or a recipient device. For example, a particular cell phone may at one point initiate a call but at another time may receive a call. Therefore, the labels of initiating device and recipient device are illustrative only and indicate only a particular device's function at a specific point in time rather than indicating any limits on its functionality overall.

In use, the service provider system 105 can receive from the initiating end device 110 a request to set a calendar event. The request can include event definition information. The event definition information can comprise, for example, an indication of the user associated with the calendar event, an indication of the one or more end devices to which to provide notification of the calendar event, an indication of an event type, an indication of the event, etc. More specifically, an indication of the user associated with the calendar event can comprise an address, name, alias, or other identifier indicating the user setting the calendar event. Similarly, an indication of the one or more end devices to which to provide notification of the calendar event can comprise an address, name, alias, or other identifier indicating the users or devices to be informed or notified upon the occurrence of the calendar event. An indication of an event type, if any, can comprise textual, numeric, or other format information indicating type of event from one or more possible event types such as a meeting, a task to do, etc. An indication of the event can include information defining the event such as a time, date, reminder information, recurrence information, etc.

The event definition information can be read from the request by the service provider system 105 and/or the calendar service system 140 to set the calendar event. Additionally, at least some of the event definition information can be stored in the user profile database 115 in the profile information for the user associated with the calendar event such as the user of the initiating device 110. For example, information indicating devices or users to be notified on the occurrence of the calendar event can be stored in the profile information of the user profile database 115 for the user of the initiating device 110.

Then, at a specified time or upon the occurrence of some other event, the occurrence of the previously set calendar event can be detected by the service provider system 105 or calendar service system 140. Profile information for the user associated with the calendar event can be read from the user profile database 115 by the service provider system 105 or the calendar service system 140 and one or more end devices to which to provide notification of the occurrence of the calendar event can be determined based on the profile information. That is, when occurrence of the calendar event is detected by the service provider system or the calendar service system 140, the service provider system or the calendar service system 140 can look up or read the profile information for the user of the initiating device 110 to determine to which users or devices the user of the initiating device 110 intends to send notices.

One or more notification messages can be generated by the service provider system 105 or the calendar service system indicating occurrence of the calendar event. These notices can be generated in a format specific to the type of device to which it will be sent. That is, one the user or device is know, the type of device and/or the types or formats for notices to these devices can be determined from user profile information for those users or devices. The notices can then be generated consistent with this information. The notification message can be sent by the service provider system 105 to each of the one or more recipient end devices 120-135. Therefore, a calendar event set via one device can be detected and a notice can be provided to other devices indicated by the profile information for the user associated with or identified by that event.

Alternatively, another architecture that provides support for communications between a number of different devices of different types may be used to provide the same functions. Such an architecture is described in the above referenced, co-pending U.S. patent application titled "Cross Platform Support for a Variety of Media Types." While not necessary to implement various embodiments of the present invention, such an architecture is considered useful with embodiments of the present invention since it provides a communication bus that in turn provides a common representation, in the form of a number of common language messages, of services or information available to, from, and between end devices regardless of the type of end device or the server providing or receiving the information or service. Furthermore, the architecture includes a central user profile database that can be used to store information related to related to calendar notification features such as discussed above. An overview of this architecture is now provided for convenience.

Figure 2:
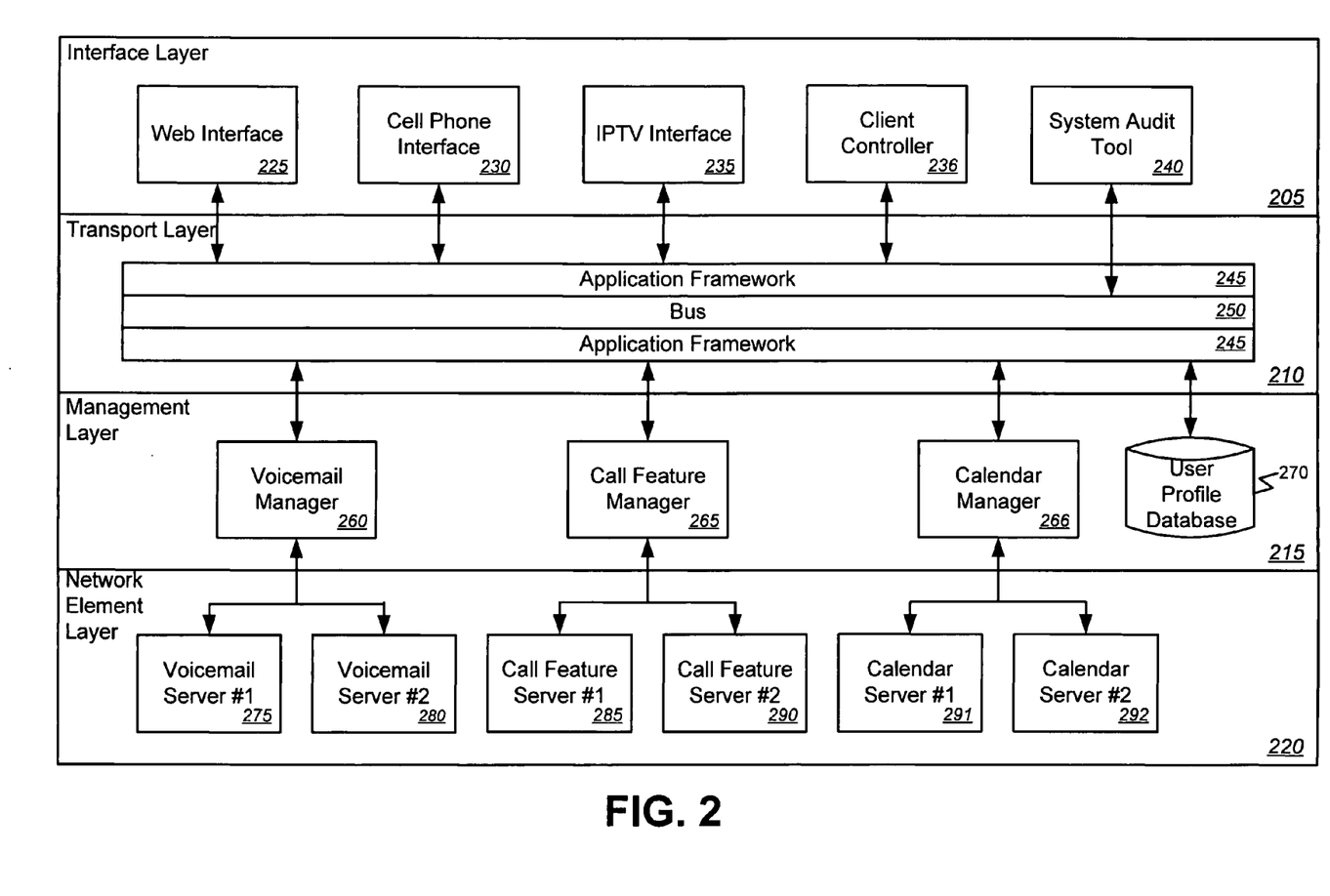
FIG. 2 is a block diagram illustrating functional component of an architecture for providing cross-platform calendar notification according to an alternative embodiment of the present invention.

FIG. 2 is a block diagram illustrating functional component of an architecture for providing cross-platform calendar notification according to an alternative embodiment of the present invention. In this example, the architecture is logically divided into four layers 205-220. The layers 205-220 include a network element layer 220, a management layer 215, a transport layer 210, and an interface layer 205. As will be seen, elements of each layer 205-220 can be communicatively coupled with elements of the next layer 205-220. So, elements of the network element layer 220 can be communicatively coupled with elements of the management layer 215 which in turn can be communicatively coupled with elements of the transport layer 210, etc.

The network element layer 220 can comprise one or more servers 275-290. The servers 275-290 of the network element layer 220 can each provide content and/or services of one or more types. For example, one or more servers 275 and 280 may provide voicemail services while one or more other servers 285 and 290 provide one or more call features such as call forwarding, caller ID, etc. Importantly, while this example shows a limited number of servers 275-290 in the network element layer 220, many more servers, providing a wide range of content or services of various types may be included. For example, one or more servers may be included for providing Internet services, television (TV) services, Email services, and various other types of data, communication, and/or entertainment services.

The management layer 215 can comprise one or more managers 260 and 265. Each manager 260 and 265 can be communicatively coupled with one or more of the servers 275-290 of the network element layer 220. For example, voicemail manager can be coupled with voicemail servers 275 and 280 while call feature manager 265 can be coupled with call feature servers 285 and 290. Importantly, while managers 260 and 265 and servers 275-290 are shown and described herein as being organized by or arranged per service, other arrangements are contemplated and considered to be within the scope of the present invention. According to one alternative, the managers 260 and 265 and the servers 275-290 may be arranged by company or provider. So, for example, one manager may be coupled with and provide access to the services and content provided by the servers of company A while another manager may be coupled with and provide access to the services and content provided by the servers of company B. However, an arrangement of managers 260 and 265 and servers 275-290 based on service and/or content type may be preferable since, as will be seen, such an arrangement can provide for easier extensibility of the system when adding features or services.

Furthermore, as noted above, additional servers may be used in the network element layer providing additional services and/or content of different types. Therefore, more, fewer, or different managers than shown in this example may be used in an actual implementation. For example an additional manager may be used for interfacing with one or more servers providing TV services or email services. In another example, one or more managers may be communicatively coupled with one or more servers tracking billable events on the architecture. That is, one manager may track calls, messages, events, or pay-per-view or other content billed on a per-use basis so that the appropriate users can be billed by the operator of the architecture, the provider of the content, and/or other parties.

According to one embodiment, the management layer 215 can include a calendar manager 266 and the network element layer 220 can include one or more calendar servers 291 and 292. As will be seen, the calendar manager 266 and calendar servers 291 and 292 can be used to read requests for calendar events from end devices, save event definition information in the profile information for the requesting user, set and detect the occurrence of calendar events, and inform one or more end devices of this occurrence.

Regardless of the exact number, nature, or organization of the servers 275-290 and managers 260 and 265, the managers 260 and 265 can be adapted to translate content of the servers 275-290 with which the manager 260 and 265 is connected from the media types of the servers 275-290 to one or more common language messages. That is, the managers 260 and 265 can provide translation from a service specific format to a common or generic format. For example, voicemail server #1 275 and voicemail server #2 280 may be operated by different entities and offer different information in different formats that may be completely incompatible with each other. However, voicemail manager 260 provides for translating these different functions, formats, etc into a common language message that can be used by all other elements of the architecture.

According to one embodiment of the present invention, the managers 260 and 265 can provide defined interfaces to the servers 275-290 of the network element layer 220. By using calls, invocations, requests, or other signals or messages to the managers 260 and 265, the servers 275-290 can pass content or messages to the managers 260 and 265 for translation to a common language message for transmission to another element of the architecture. For example, voicemail manager 260 may provide an Application Program Interface (API) for use by any voicemail server 275 and 280 connected with the voicemail manager 260. Voicemail servers 275 and 280 can then use API calls to the voicemail manager 260 to initiate services, pass content or other information, and/or otherwise communicate with the voicemail server 260. According to one embodiment of the present invention, calls to the API or other interface may be closely analogous to the common language messages generated by the manager. For example, as will be described in detail below, the manager may generate "InitiateCommunication" message to initiate a communication. The manager's API may also provide a "InitiateCommunication" or other similar call to the servers to which it is connected through which the servers can initiate a communication.

While use of an API or other defined interface between the managers 260 and 265 and the servers 275-290 is not required, it may be preferred since, by using an API or other type of defined interface, the managers 260 and 265 can be easily extended or modified as services and/or content of the servers are added or changed or as new servers are added. That is, the use of a defined interface such as an API allows greater extensibility since the only changes made at the manager would be to add or modify an appropriate "stub," module, or routine to add a new server, service, or content type without a need to make wholesale changes or re-write the managers.

According to one embodiment of the present invention, the manager and the API or interface of the manager may be implemented using object-oriented programming techniques. In such a case, the manager API calls made by the servers can cause the stub or module of the manager interfacing with the server to instantiate an object of a particular class type, such as a "InitiateCommunication" object, with properties representing, among other possibilities, the content of data to be communicated, the intended recipient(s), etc. Such an object or common language message may be defined in a common format readable by other elements of the architecture. For example, the object may be defined in an eXtensible Markup Language (XML) file. The manager can then transmit this object or common language message to any or all of the other elements of the architecture via the transport layer 210.

The transport layer 210 can comprise a communications bus 250 communicatively coupled with each of the managers 260 and 265. The bus 250 can be adapted to receive and transport the one or more common language messages from the managers 260 and 265. The transport layer 210 can also comprise an optional application framework 245 interposed between the end devices 225-236 of the interface layer 205 and the communications bus 250 and between the managers 260 and 265 and the communications bus 250. Generally speaking, the application framework 245 provides for monitoring and tracking of the common language messages placed on the bus 250 of the transport layer 210.

Regardless of whether the application framework 245 is used, the bus 250 of the transport layer 210 comprises a common representation of data that is usable by all elements of the architecture. Furthermore, the bus 250 provides this message to any or all devices in the architecture as appropriate regardless of the type of device.

According to one embodiment of the present invention, the bus 250 may also be implemented using object-oriented programming techniques. In such a case, a manager placing or sending a common language message on the bus 250 can call or invoke an API or other interface of the bus 250 or otherwise cause the instantiation of an object of a particular class type, such as a "InitiateCommunication" object, with properties representing, among other possibilities, the content of data to be communicated, the intended recipient(s), etc. The bus can then make this object or common language message available to any or all of the other elements of the architecture.

The interface layer 205 of the architecture can comprise one or more end devices 225-236 of different types. For example, the end devices 225-236 can represent a cell phone 230, a web browser 225, a TV interface 235, etc all potentially operating on different platforms with different operating systems. Each end device 225-236 can be communicatively coupled with the bus 250 of the transport layer, either directly or via the application framework 245, and can be adapted to receive and translate the common language messages to a format specific to the end device based on its type.

Alternatively or additionally, one or more of the end devices may comprise a client controller 236 communicatively coupled with the bus 250 of the transport layer 210 and one or more other end devices (not shown here) such as a personal computer, television Set-Top Box (STB), telephone, or other type of device. If used, the client controller 236 can be adapted to receive common language messages from the bus 250, translate content from the common language messages to a format specific to the end device(s) for which it is intended, and deliver the device specific message to the device or devices. In some cases, the client controller 236 may also be adapted to act as a firewall for end devices communicating via the bus 250 of the transport layer 210.

That is, the end devices 225-236 can translate from the common language messages, such as an XML message, to device specific representations of the information in that message for presentation to user in whatever format that device uses. According to one embodiment, the translation functions of the end devices can also be implemented using object-oriented programming techniques. In such a case, the end devices receive the common language messages such as XML encoded representations of the objects on the bus 250 of the transport layer 210. Translation can therefore comprise instantiating on the end device an object of the class indicated by the message with the properties indicated by the message thereby translating the properties of the object on the bus to a presentation language of the device.

Thus far, the description of the architecture has focused on messages from the servers 275-290 to the end devices 225-236. However, the end devices 225-236 can also be adapted to generate one or more common language messages based on user input and send the one or more common language messages to one or more of the managers 260-265 via the bus 250. For example, a cell phone 230 or other end device 225-236 can generate a "InitiateCommunication" message to be sent to any or all of the managers 260-265 or even to another end device. Therefore, the managers 260-265 can be further adapted to receive the common language messages from the end devices 225-236 via the bus 250 and to translate the common language messages to content of the media type of the servers 275-290 with which the manager 260 and 265 is connected.

According to one embodiment of the present invention, the architecture can include a user profile database 270 communicatively coupled with the bus 250 of the transport layer. The user profile database 270 can be adapted to maintain records of a set of user preferences for one or more of the end devices 225-236 of the interface layer 205. For example, TV or cell phone settings or options for a particular device and/or a particular user can be stored in the user profile database 270 for retrieval by one or more of the end devices 225-236 or one or more of the managers 260 and 265. Therefore, he user profile database 270 can be adapted to provide the preferences to one or more of the end devices 225-236 or one or more of the managers 260 and 265 in response to a common language message received via the bus 250. In another example, the user profile database 270 can be adapted to store information related to calendar notification features. More specifically, user profile database 270 can include a list of phone numbers, device addresses, or other identifying information for one or more recipient devices that a user of an initiating device may wish to notify on the occurrence of a calendar event. In other words, the user profile database 115 can include an identifier, such as a phone number, email address, Internet Protocol (IP) address, instant message address, physical address, MAC address, etc for each of one or more possible recipient devices. When the service provider system 105 or calendar service system 140 detects the occurrence of a calendar event, the service provider system 105 can look up devices to be informed of the occurrence and generate a message, communication, notification, etc. appropriate to each of those devices to inform the recipient of the calendar event. In this way, the identified devices can "ring" or otherwise inform the user of the calendar event.

According to another embodiment of the present invention, the architecture can further comprise a system audit tool 240 communicatively coupled with the bus 250 of the transport layer 210. The system audit tool 240 can be adapted to monitor common language messages on the bus 250.

Therefore, in use, the bus 250 provides a common representation of services or information available to, from, and between the end devices 225-236 regardless of the type of end device or the server providing or receiving the information or service. This common representation is in the form of a number of common language messages. The type, number, format, etc. of the common language messages can vary widely depending upon the exact implementation without departing from the scope of the present invention. However, for illustrative purposes only, some exemplary messages will be described.

According to one embodiment, the common language messages can include a "InitiateCommunication" request message indicating a request to initiate a communication. Similarly, the common language messages can include a "InitiateCommunication" response message acknowledging initiation of a communication. According to another embodiment, the common language messages can include a "Call Information" request indicating a request for information relating to a communication and a "Call Information" response providing requested information. The common language messages can also include a "Calendar Event Request" message to request setting of a calendar event and/or a "Calendar Event Notification" message indicating the occurrence of a calendar event.

In some cases, the common language messages can include an "Update Profile" message indicating a change to one or more user defined preferences. As indicated above, such a message can be useful in updating one or more entries in the user profile database 170. Furthermore, such a message may be useful in informing other devices of a change.

The various types of message can take any of a variety of possible formats without departing from the scope of the present invention. However, for illustrative purposes only, an exemplary format for a message may be considered to include a header and a body. The header may include information such as any or all of: an address or other indication of the device or devices for which the message is intended; an address or other indication of the device originating the message; an indication of the message type; an indications of the type of contents in the message; etc. The message body may include information such as representation of or actual content to be transferred. Therefore, the body can contain an email message, an MP3 or MP4 audio or video file, a hyperlink or other direction to a location of the actual content, etc. However, once again, the exact format of the common language messages can vary widely depending on the exact implementation.

Regardless of the exact format, translating content to a common language message or generating a common language message can comprise generating a file, such as an XML file, of the appropriate format to indicate the type of message and the end devices for which it is intended and possibly an indication of the contents. Alternatively, as indicated above, various components of the architecture may be implemented using object-oriented programming techniques. In such a case, generating a common language message can comprise instantiating an object of a particular class type, such as a "InitiateCommunication" object, with properties representing, among other possibilities, the content of data to be communicated, the intended recipient(s), etc.

In use, the calendar manager 266 can receive from an initiating end device 225 a request, such as a "Calendar Event Request" or other common language message, to set a calendar event. The request can include event definition information. The event definition information can comprise, for example, an indication of the user associated with the calendar event, an indication of the one or more end devices to which to provide notification of the calendar event, an indication of an event type, an indication of the event, etc. More specifically, an indication of the user associated with the calendar event can comprise an address, name, alias, or other identifier indicating the user setting the calendar event. Similarly, an indication of the one or more end devices to which to provide notification of the calendar event can comprise an address, name, alias, or other identifier indicating the users or devices to be informed or notified upon the occurrence of the calendar event. An indication of an event type, if any, can comprise textual, numeric, or other format information indicating type of event from one or more possible event types such as a meeting, a task to do, etc. An indication of the event can include information defining the event such as a time, date, reminder information, recurrence information, etc.

The event definition information can be read from the request by the calendar manager 266 to set the calendar event. Additionally, at least some of the event definition information can be stored in the user profile database 270 in the profile information for the user associated with the calendar event such as the user of the initiating device 225. For example, information indicating devices or users to be notified on the occurrence of the calendar event can be stored in the profile information of the user profile database 270 for the user of the initiating device 225 by the calendar manager 266 issuing an "Update Profile" or other common language message.

Then, at a specified time or upon the occurrence of some other event, the occurrence of the previously set calendar event can be detected by the calendar manager 266. Profile information for the user associated with the calendar event can be read from the user profile database 270 by the calendar manager 266 and one or more end devices to which to provide notification of the occurrence of the calendar event can be determined based on the profile information. That is, when occurrence of the calendar event is detected by the calendar manager 266, the calendar manager 266 can look up or read the profile information for the user of the initiating device 225 to determine to which users or devices the user of the initiating device 225 intends to send notices.

One or more notification messages, such as "Calendar Event Notification" or other common language messages, can be generated by the calendar manager 266 indicating occurrence of the calendar event. The message can include an indication of the event, a message associated with the event and/or other possible information. The notification message can be sent by the calendar manager 266 to each of the one or more recipient end devices 230-236. Therefore, a calendar event set via one device can be detected and a notice can be provided to other devices indicated by the profile information for the user associated with or identified by that event.

Figure 3:
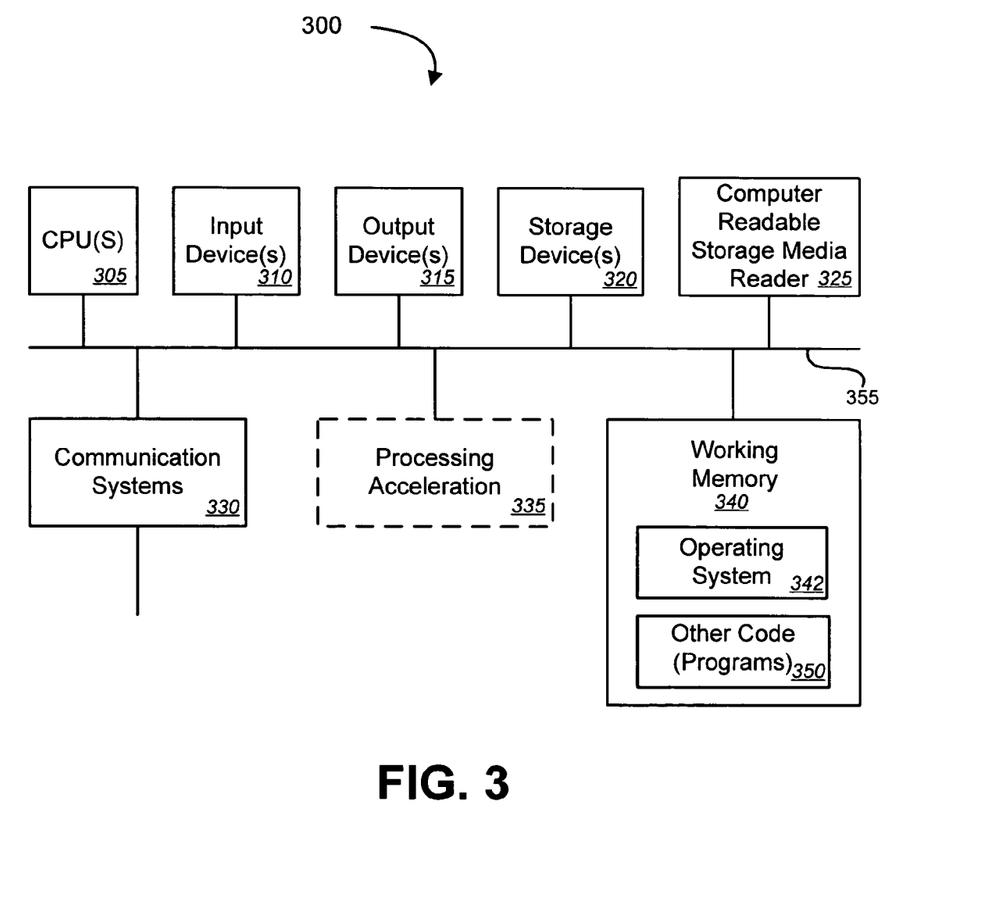
FIG. 3 is a block diagram illustrating an exemplary computer system in which embodiments of the present invention may be implemented.

FIG. 3 is a block diagram illustrating an exemplary computer system in which embodiments of the present invention may be implemented. This example illustrates a computer system 300 such as may be used, in whole, in part, or with various modifications, to provide various components of the systems discussed above.

The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device (s) 320) comprehensively representing remote, local, fixed, and/or removable storage devices plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 345 and/or other code 350. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Software of computer system 300 may include code for code 350 for implementing any or all of the function of the various elements of the architecture as described herein. For example, software, stored on and/or executed by a computer system such as system 300, can provide the functions of the service provider system, a manager, an end device, etc. Methods implemented by software on some of these components will be discussed in detail below.

Figure 4:
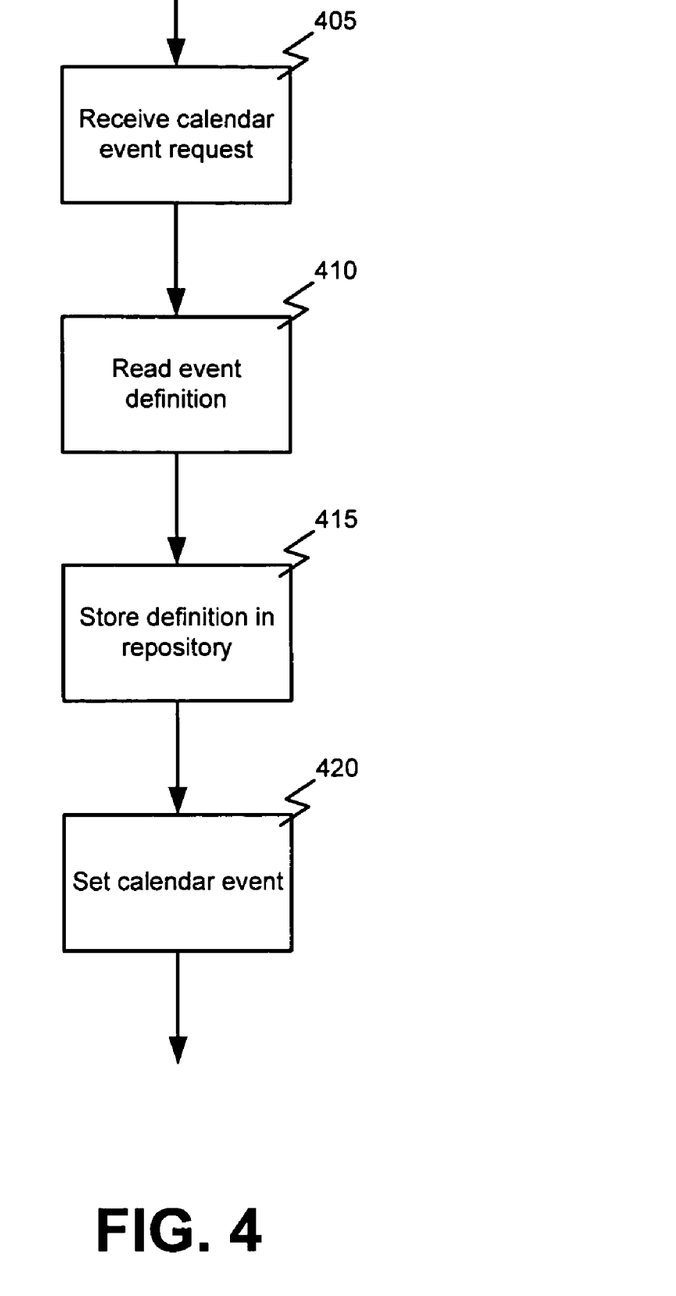
FIG. 4 is a flowchart illustrating a process for setting cross-platform calendar events according to one embodiment of the present invention.

FIG. 4 is a flowchart illustrating a process for setting cross-platform calendar events according to one embodiment of the present invention. This example represents a process that may be performed by the service provider system discussed above with reference to FIG. 1, one or more of the servers or managers of the network element layer discussed above with reference to FIG. 2, or another system or device depending upon the environment in which the methods are implemented.

In this example, the implementing system can receive 405 a request to set the calendar event. As indicated above, the request can include event definition information. The event definition information can comprise, for example, an indication of the user associated with the calendar event, an indication of the one or more end devices to which to provide notification of the calendar event, an indication of an event type, an indication of the event, etc. More specifically, an indication of the user associated with the calendar event can comprise an address, name, alias, or other identifier indicating the user setting the calendar event. Similarly, an indication of the one or more end devices to which to provide notification of the calendar event can comprise an address, name, alias, or other identifier indicating the users or devices to be informed or notified upon the occurrence of the calendar event. An indication of an event type, if any, can comprise textual, numeric, or other format information indicating type of event from one or more possible event types such as a meeting, a task to do, etc. An indication of the event can include information defining the event such as a time, date, reminder information, recurrence information, etc.

The event definition information can be read 410 from the request to set the calendar event and at least some of the event definition information can be stored 415 in the profile information for the user associated with the calendar event. For example, information indicating recipients of the notification, a message or other information to be included in or associated with the notification, and other information can be stored 415 in the user profile information for the user making the request.

One or more calendar events can be set 420 based at least in part on the event definition information. For example, setting 420 a calendar event can comprise setting a timer or other event monitoring process or procedure. This timer or other process can be set based on, for example, a time or other information included in the request for the calendar event.

Figure 5:
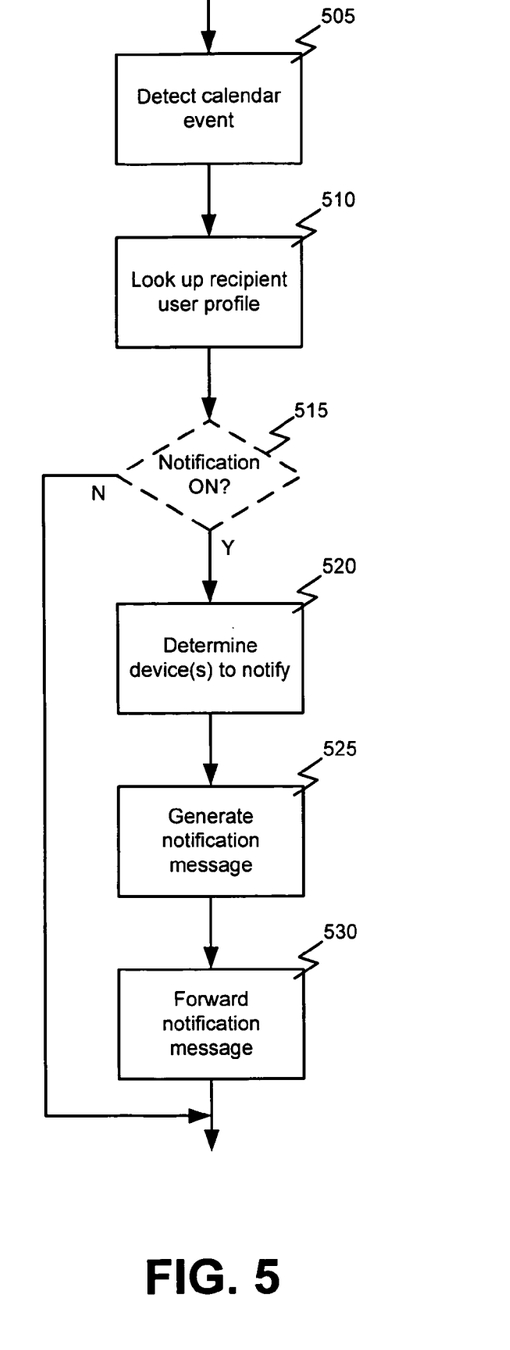
FIG. 5 is a flowchart illustrating a process for cross-platform calendar notifications according to one embodiment of the present invention.

FIG. 5 is a flowchart illustrating a process for cross-platform calendar notification according to one embodiment of the present invention. This example represents a process that may be performed by the service provider system discussed above with reference to FIG. 1, one or more of the servers or managers of the network element layer discussed above with reference to FIG. 2, or another system or device depending upon the environment in which the methods are implemented and illustrates the processes performed by the initiating device as well as the recipient device.

In this example, an occurrence of a previously set calendar event can be detected 505. Detection of this event can be based on a timer expiring or reaching a preset time and date or on the occurrence of some other event. The calendar event, whether based on a time and date or some other event can be set as discussed above with reference to FIG. 4.

Upon detection 505 of the calendar event, profile information for a user associated with the calendar event can be read. That is, profile information associated with a user and/or device that requested the calendar event can be read 510 from a repository such as a user profile database.

Optionally, a determination 515 can be made based on the profile information whether calendar notifications are enabled. This determination can be based on a flag, switch, or other indication set or stored in the profile information indicating whether the user has elected to enable or turn on calendar notifications. If a determination 515 is made that calendar notifications are enabled, operation may proceed as follows.

Based on the profile information for the user or device associated with the calendar event, one or more end devices to which to provide notification of occurrence of the calendar event can be determined. That is, as discussed above, the calendar event request can include an indication of one or more users and/or devices to be notified upon the occurrence of the calendar event. This information can be stored in the profile information of the user requesting the calendar event. Upon occurrence of the event, the profile information can be read 510 to determine 520 what devices and/or users to notify.

A notification message can be generated 525. The notification message can indicate occurrence of the calendar event, may include other information from the profile information of the requestor, such as a message or other information, and can be addressed or otherwise directed to the recipients. The notification message can then be sent to each of the one or more recipient end devices (block 530).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing cross-platform calendar notifications, the method comprising:
   receiving, at a computer system, a request to set a calendar event, the request including event definition information;
   reading the event definition information from the request to set the calendar event;
   storing at least some of the event definition information in a user profile for a user associated with the calendar event, the user profile stored in a user profile database;
   setting, in a calendar system, a calendar event based at least in part on the event definition information, the calendar system being separate from the user profile database;
   detecting, with the computer system, an occurrence of the previously set calendar event;
   reading, with the computer system, profile information, including at least some of the stored event definition information, from the user profile of the user associated with the calendar event; and
   determining, with the computer system and based on the profile information, two or more end devices to which to provide notification of occurrence of the calendar event wherein, the two or more end devices comprises a plurality of different device types, each of the two or more end devices adapted to send and receive common language messages and translate received common language messages to a format specific to the end device based on the device type.

2. The method of claim 1, further comprising generating a common language notification message indicating occurrence of the calendar event.

3. The method of claim 2, further comprising sending the common language notification message to each of the two or more end devices.

4. The method of claim 1, further comprising determining from the profile information whether calendar notifications are enabled prior to determining two or more end devices to which to provide notification of the calendar event.

5. The method of claim 4, wherein determining two or more end devices to which to provide notification of the calendar event is performed in response to determining calendar notifications are enabled.

6. The method of claim 1, wherein the event definition information comprises an indication of the user associated with the calendar event.

7. The method of claim 1, wherein the event definition information comprises an indication of the two or more end devices to which to provide notification of the calendar event.

8. The method of claim 1, wherein the event definition information comprises an indication of an event type.

9. The method of claim 1, wherein the event definition information comprises an indication of the event.

10. A system for providing cross-platform calendar notifications, the system comprising:
   a communications bus;
   a user profile database communicatively coupled with the communications bus and adapted to maintain profile information for a plurality of users;
   a plurality of end devices of different types, each end device communicatively coupled with the communications bus and adapted to send and receive common language messages via the communications bus, to translate common language messages received from the communications bus to a format specific to the end device based on the type, and to store user profile information in the user profile database;
   a manager communicatively coupled with the communications bus and configured to:
      receive a request to set a calendar event, the request including event definition information;
      read the event definition information from the request to set the calendar event;
      store at least some of the event definition information in a user profile for a user associated with the calendar event, the user profile stored in a user profile database;
      set, in a calendar system, a calendar event based at least in part on the event definition information, the calendar system being separate from the user profile database;
      detect an occurrence of the previously set calendar event;
      read profile information, including at least some of the stored event definition information, from the user profile of the user associated with the calendar event; and
      determine, based on the profile information, two or more end devices to which to provide notification of occurrence of the calendar event.

11. The system of claim 10, wherein the manager is further adapted to determine from the profile information for the user associated with the calendar event whether calendar notifications are enabled prior to determining one or more recipient end devices.

12. The system of claim 11, wherein determining one or more recipient end devices, generating a common language message comprising a notification message indicating occurrence of the calendar event, and sending the notification message to each of the one or more recipient end devices is performed in response to determining calendar notifications are enabled.

13. The system of claim 10, wherein the event definition information comprises an indication of the user associated with the calendar event.

14. The system of claim 10, wherein the event definition information comprises an indication of the one or more end devices to which to provide notification of the calendar event.

15. The system of claim 10, wherein the event definition information comprises an indication of an event type.

16. The system of claim 10, wherein the event definition information comprises an indication of the event.

17. A machine-readable storage medium having stored thereon a series of instructions that, when executed by a processor, cause the processor to perform cross-platform calendar notifications by:
   receiving a request to set a calendar event, the request including event definition information;
   reading the event definition information from the request to set the calendar event;
   storing at least some of the event definition information in a user profile for a user associated with the calendar event, the user profile stored in a user profile database;
   setting, in a calendar system, a calendar event based at least in part on the event definition information, the calendar system being separate from the user profile database;
   detecting an occurrence of the previously set calendar event;

reading profile information, including at least some of the stored event definition information, from the user profile of the user associated with the calendar event; and determining based on the profile information two or more end devices to which to provide notification of occurrence of the calendar event, wherein, the two or more end devices comprises a plurality of different device types, each of the two or more end devices adapted to send and receive common language messages and translate received common language messages to a format specific to the end device based on the device type.

18. The machine-readable medium of claim 17, further comprising generating a common language notification message indicating occurrence of the calendar event.

19. The machine-readable medium of claim 18, further comprising sending the common language notification message to each of the two or more end devices.

20. The machine-readable medium of claim 17, wherein the event definition information comprises an indication of the user associated with the calendar event.

21. The machine-readable medium of claim 17, wherein the event definition information comprises an indication of the two or more end devices to which to provide notification of the calendar event.

22. The machine-readable medium of claim 17, wherein the event definition information comprises an indication of an event type.

23. The machine-readable medium of claim 17, wherein the event definition information comprises an indication of the event.

* * * * *

UNITED STATES PATENT AND TRADEMARK OFFICE
CERTIFICATE OF CORRECTION

PATENT NO.        : 8,078,476 B2
APPLICATION NO.   : 11/399097
DATED             : December 13, 2011
INVENTOR(S)       : Jordan Alperin et al.

It is certified that error appears in the above-identified patent and that said Letters Patent is hereby corrected as shown below:

Column 1, Line 26, delete "work line a home" and insert --work line, a home--, therefor.

Column 1, Line 31, delete "personal computers various" and insert --personal computers, various--, therefor.

Column 1, Line 39, delete "device a event" and insert --device an event--, therefor.

Column 1, Line 52, delete "cell phone with" and insert --cell phones with--, therefor.

Column 1, Line 54, delete "types of device." and insert --types of devices.--, therefor.

Colum 3, Line 13, delete "series of instruction" and insert --series of instructions--, therefor.

Colum 6, Line 37, delete "one the user or device in know," and insert --once the user or device is known--, therefor.

Column 6, Line 55, delete "useful. with embodiments" and insert --useful with embodiments--, therefor.

Column 6, Line 63, delete "information related to related to" and insert --information related to--, therefor.

Column 10, Line 27, delete "Therefore, he user" and insert --Therefore, the user--, therefor.

Column 11, Line 27, delete "an indications of" and insert --an indication of--, therefor Signed and Sealed this
Twenty-ninth Day of May, 2012

David J. Kappos
*Director of the United States Patent and Trademark Office*